Jan. 22, 1952  W. M. PERRY ET AL  2,583,443
PALLET FOR HANDLING MATERIALS
Filed Dec. 4, 1947  2 SHEETS—SHEET 1
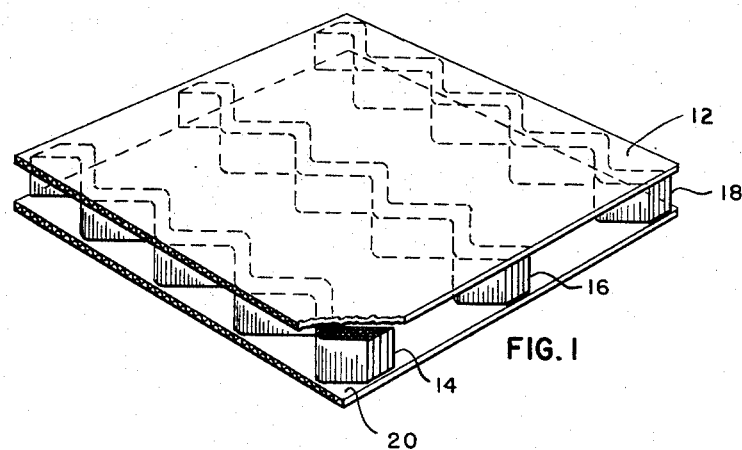
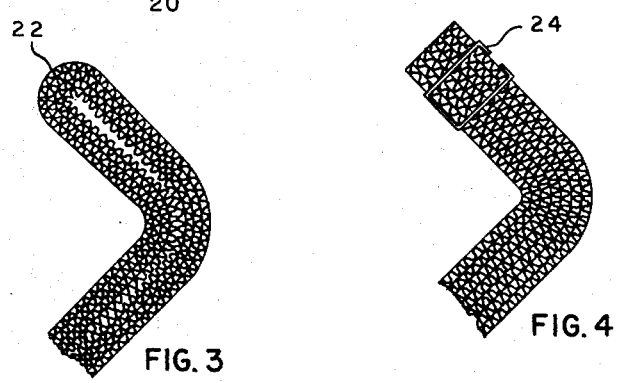
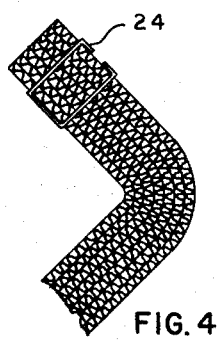
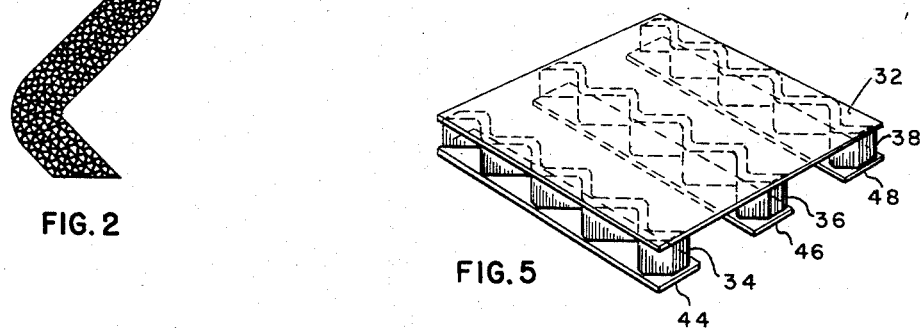
INVENTORS
WALTER M. PERRY &
FAIRFIELD S. PERRY
BY James and Franklin Jan. 22, 1952  W. M. PERRY ET AL  2,583,443
PALLET FOR HANDLING MATERIALS
Filed Dec. 4, 1947  2 SHEETS—SHEET 2

INVENTORS
WALTER M. PERRY &
BY FAIRFIELD S. PERRY

Patented Jan. 22, 1952

2,583,443

UNITED STATES PATENT OFFICE 2,583,443

PALLET FOR HANDLING MATERIALS

Walter M. Perry, Darien, and Fairfield S. Perry, New Canaan, Conn.

Application December 4, 1947, Serial No. 789,584

8 Claims. (Cl. 248—120)

This invention relates to pallets for handling materials, and more particularly to an expendable pallet made of paper.

The usual pallet for handling materials is built of wood or steel, and is too costly to throw away. It has heretofore been suggested to provide a low cost pallet which may be shipped with the product, and which may later be discarded, or sold as scrap paper. There are numerous savings effected by using such an expendable or throwaway pallet. The materials are loaded on the pallets and strapped or glued in position, preferably as soon as possible, say at the packaging or manufacturing machine. The loads therefore are palleted for transfer and storage in the stock room of the shipper, as well as during loading of a freight car or a truck for shipment, and the material may be handled economically by a standard fork truck during all these moves. The material may, as usual, be stacked two or three or more pallets high. For many materials the cost of loading may be a matter of only one tenth or fifteenth of the cost when pallets are not used. A corresponding saving is obtained at the receiving station during unloading of the material from freight car or truck, and storage at a warehouse, or reshipment.

The general object of the present invention is to improve expendable pallets. One prior suggestion for a pallet employs strips of corrugated paper standing edgewise and acting as spacers between top and bottom boards. In such a pallet the spacers are narrow and consequently a large number of spacers are needed, or the unsupported span between spacers is excessive. The ends of the spacers are vulnerable to damage if struck by the forks of a fork truck. There is inadequate rsistance to displacement of the upper board relative to the lower board in a direction which tends to tilt the spacers.

Another suggestion has been to spirally wind strips of corrugated paper to form very short, squat columns which are cemented between upper and lower boards. This is an expensive construction because a large number of such individual supports are needed, and must be assembled with the boards.

The primary object of the present invention is to overcome the foregoing difficulties, and to provide an expendable corrugated paper pallet which will be inexpensive to manufacture, and satisfactory in use.

To accomplish the foregoing general objects, and other more specific objects which will hereinafter appear, our invention resides in the pallet elements and their relation one to the other as described in the following specification. The specification is accompanied by drawings in which:

Fig. 1 is a perspective view of a pallet embodying features of our invention;

Fig. 2 is a fragmentary plan view of one of the spacers drawn to enlarged scale;

Fig. 3 is a fragmentary plan view of a modified form of spacer;

Fig. 4 is a similar view showing still another modification;

Fig. 5 is a perspective view generally similar to Fig. 1, but showing a modified pallet using base strips instead of a base board;

Figure 6:
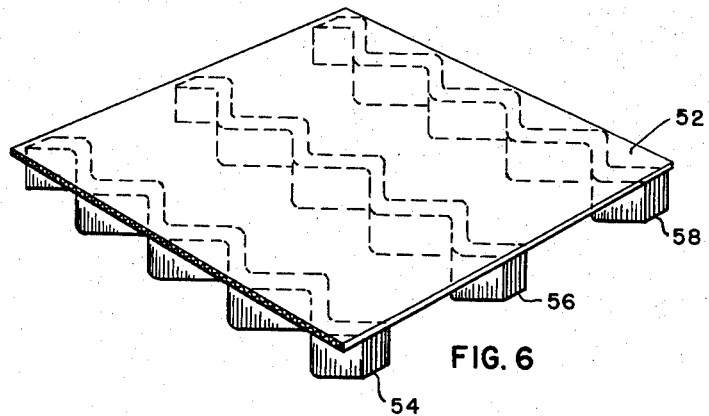
Fig. 6 is a similar view of still another modification.

Referring to the drawings, and more particularly to Fig. 1, the pallet comprises a corrugated paper board or elevated platform or deck 12 with a plurality of collateral spacers 14, 16, and 18 therebeneath. There is also a base board 20 which is preferably coextensive with a similar in character to the deck 12, so that the pallet may be used with either side uppermost.

In accordance with the present invention, the spacers are made up of strips of corrugated paper bent in zigzag formation. In the present case there are three such spacrs, and in general this is a preferred number because it is readily possible to so dimension the parts as to receive the forks of a fork truck, but in some cases four spacers may be needed, as described later. The strips which make up the spacers may be cemented to one another, and one manufacturing advantage of the present invention is that continuous strips may be cemented together and simultaneously bent into the desired zigzag formation, all prior to being cut into short pieces of desired length. Thus the cementing together of the strips will itself hold them in zigzag formation. The spacers are secured between the top and bottom boards, most simply by cementing the same in position.

Compared to the use of straight strips, the zigzag strips have important advantages. They provide a better distribution of support under the load for any given amount of material in the spacers, for the apparent or effective width of each spacer is the overall width of the zigzag strip, rather than the thickness of the material.

In consequence, the width of the unsupported span between spacers is very substantially reduced. Another advantage is that the spacers are stronger and more resistant to shear or to splitting, such as might result when the forks of a fork truck accidentally strike the ends of the spacers. With the zigzag spacers, the forks strike inclined surfaces, and tend to glance off rather than to shear or split apart the plies. Another advantage is that because the parts of the zigzag spacers are disposed on the bias, that is at an angle to the edges of the pallet, they add greatly to the cross strength of the pallet.

Fig. 2 shows the end portions of one of the zigzag spacers. It will be noted that it is made up of a number, in this case six, corrugated paper strips which are secured together, as for example by cementing. It will also be noted that the severance at the ends is such that one strip may be added continuously to the next, or to express the matter more realistically, the individual spacers may be severed from a continuous length of zigzag spacer material.

However, it is not essential that the spacers be formed in this manner, and Fig. 3 illustrates a modification in which each spacer is made up of a length of material having about half the thickness and twice the length of the spacers shown in Fig. 2. The material is reversely folded at its mid-point, as is indicated at 22.

Fig. 4 shows still another modification in which the plies of corrugated paper making up the spacer are secured together by staples, one of which is indicated at 24.

In Fig. 5 we show a modification in which the elevated platform 32 and the spacers 34, 36, and 38 all correspond to those shown in Fig. 1, but in which the base of the pallet is made up of three strips of corrugated paper, the strip 44 being cemented beneath spacer 34; the strip 46 being cemented beneath spacer 36; and the strip 48 being cemented beneath the spacer 38. In other words, it is not essential to employ a bottom board which is co-extensive with the deck.

In fact, it is not essential to employ a base at all, and still another modification of the invention is shown in Fig. 6 in which there is an elevated platform or deck 52, and collateral zigzag spacers 54, 56, and 58, all as described in connection with Figs. 1 and 5, but the zigzag spacers rest directly on the floor, or on the top of another palleted stack of material.

Figure 7:
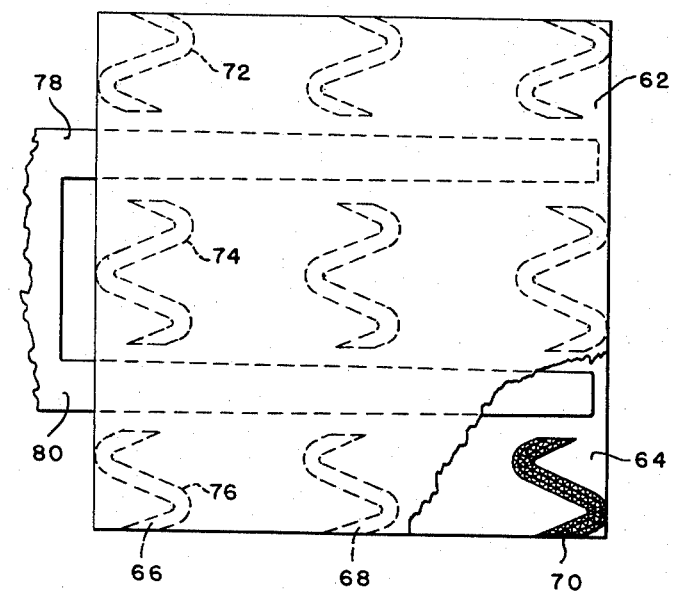
Fig. 7 shows a variation which is applicable to any of Figs. 1, 5 or 6, and which adapts the pallet to receive the forks of a fork truck from any of the four edges of the pallet.

The pallets so far described will receive the forks of a fork truck from either of two opposite edges, but will not receive the same through the transverse edges. In Fig. 7 we show a modification of the invention in which the elevated platform 62 is separated from base 64 by collateral spacers 66, 68, and 70, all as previously described, but in which each of the spacers is itself interrupted or cut in shorter lengths which are spaced apart to provide gaps therebetween. In the present case, spacer 66 is made up of a short length 72, a longer length 74, and a short length 76. The gaps therebetween are dimensioned to receive the forks 78 and 80 of a fork truck. The parts 72, 74, and 76 may be severed from one continuous piece of zigzag spacer material, so that there is no waste of material in forming the interrupted spacers.

It is evident that with the modified pallet shown in Fig. 7, the fork 78, 80 can enter the pallet from any of its four edges. It will also be evident that the interrupted spacers of Fig. 7 may be used with the pallets of Figs. 5 and 6, as well as with the pallet of Fig. 1, that is, with or without a base board.

Some typical dimensions may be given, but it is to be understood that these are solely by way of exemplification and not in limitation of the invention. Pallets may be made in any desired dimension, but perhaps the most common sizes in use are 40" x 48", and 48" x 48". A somewhat smaller pallet in common use is 30" x 40". The spacing of the forks is adjustable on most fork trucks, although a common spacing is from 20" to 24" between the center lines of the forks. A common width of fork is say 6", and a common length of fork is from 42" to 48". Some small hand trucks have a spacing of 9" between the inner edges of the forks, and in a few cases this spacing is not adjustable.

In the case of a pallet 30" x 40", the spacers preferably run in the direction of the short edge, that is from the long edge to the long edge. The spacers are bent to have an overall width of say 7", leaving a clearance or span between spacers of a little over 9". This readily receives adjustable forks having a width of 6", and it also readily receives a non-adjustable fork having a span of 9" between the inner edges of the forks.

The angle at the bend of the zigzag spacers, and the thickness or the number of plies of material in the zigzag spacers, depends upon the load to be carried by the pallet. The angle at the bend is preferably about 60°, but for a very light load the angle may be increased to a maximum of say 90°, and for a heavy load may be decreased to a minimum of say 45°. The angle is, of course, interrelated with the thickness of the spacer, for any given load.

In the case of a pallet 40" x 48", the spacers again preferably extend between the long edges, or parallel to the short edges. The overall width of the spacers may be about 8", leaving an unsupported span between spacers of about 12". However, for a heavier load, the width of the spacers may be increased somewhat over 8", and the span between spacers will be correspondingly decreased. For very heavy loading, the structure may be changed to use four instead of three collateral spacers, and in such case the spacers may have a width of say 6", with an unsupported span therebetween of say 8". Here again for either structure (that is with either three spacers or four spacers), the angle at the bend and the thickness of the spacer may be varied in accordance with the load to be carried by the pallet. The angle may be increased from 60° toward an upper limit of say 90° for very light loads, and may be decreased from 60° toward a lower limit of 45° for heavy loads.

A pallet which is 48" square may have spacers the same as those described for the 40" x 48" pallet. For example, three spacers having a width of say 8", or four spacers having width of say 6", may be employed. The angle at the bend, and the thickness of the spacers, as well as their width, may be varied as previously described.

In substantially all cases, the thickness of the zigzag spacer may run from say 1½" to 2". For very light loads the thickness may be reduced to say 1", but in general a thin spacer is not desirable because the pallet may lack stability when excessively thin spacers are employed. This suggested thickness refers to the use of corrugated paper rather than solid materials.

The cardboard or the corrugated board material may be impregnated with a suitable stiffening composition, for example silicate of soda, or a synthetic resin, or sulphur, in order to tsiffen the paper when extra strength and stiffness is required.

It is believed that the method of construction and use of our improved pallet, as well as the advantages thereof, will, in the main, be apparent from the foregoing detailed description. It will also be apparent that while we have shown and described our invention in several preferred forms, many changes may be made in the structure disclosed without departing from the spirit of the invention, as sought to be defined in the following claims. In those claims which refer to the paper as being corrugated, it will be understood that the flutes are preferably vertical in order to obtain maximum compressive strength.

We claim:

1. A pallet for handling materials, said pallet comprising a main board, and a plurality of thick zigzag spacers secured to the bottom thereof, each of said spacers being made of five or more laminations of corrugated paper board having a combined thickness of at least one inch and all bent in zigzag formation and standing side face to side face, and the overall width of each zigzag spacer being substantial relative to the size of the pallet, said zigzag spacers being unsheathed so that the open edges and the zigzag side faces of the corrugated board are exposed, the open edges being cemented directly to the main board.

2. A pallet as defined in claim 1 in which a base strip is secured beneath each of the zigzag spacers.

3. An expendable pallet for handling materials, said pallet comprising a corrugated paper board platform, a plurality, say three or four, thick zigzag spacers cemented in collateral relation to the bottom thereof, each of said spacers being made up of five or more plies of corrugated paper board having a combined thickness of at least one inch and all bent in zigzag formation and standing side face to side face, said zigzag spacers being unsheathed so that the open edges and the zigzag side faces of the corrugated board are exposed, the open edges being cemented directly to the platform, the overall width of each zigzag spacer being substantial relative to the size of the pallet and approaching the clearance between spacers, and the spacing between said spacers being so dimensioned as to receive the forks of a fork truck.

4. A pallet as defined in claim 3 in which a base strip of corrugated paper board is cemented beneath and to each of the zigzag spacers.

5. A pallet for handling materials, said pallet comprising two main boards and a plurality of thick zigzag spacers secured between said boards in collateral relation, each of said spacers being made of five or more laminations of corrugated paper board having a combined thickness of at least one inch and all bent in zigzag formation and standing side face to side face, the overall width of said zigzag spacers being substantial relative to the size of the pallet, said zigzag spacers being unsheathed so that the open edges and the zigzag side faces of the corrugated board are exposed, the open edges being cemented directly to the main boards, and the structure being symmetrical so that either of said main boards may be used as an elevated platform or deck while the other of said main boards acts as a base.

6. A pallet for handling materials, said pallet comprising a board, and a plurality of spacers secured to the bottom thereof, each of said spacers being bent in zigzag formation, and the overall width of each zigzag spacer being substantial relative to the size of the pallet, the collateral zigzag spacers being interrupted at two points along their length to form gaps.

7. An expendable pallet for handling materials, said pallet comprising a corrugated paper platform, a plurality, say three or four, of collateral spacers cemented to the bottom thereof, each of said spacers being made up of multiple plies of corrugated paper board bent in zigzag formation, the spacing between said spacers being so dimensioned as to receive the forks of a fork truck, and the collateral zigzag spacers being interrupted at two points along their length to form gaps which are wide enough and spaced apart at a spacing suitable to receive the forks of a fork truck, whereby the fork of a fork truck may enter said pallet at any of its four edges.

8. An expendable pallet for handling materials, said pallet comprising two boards and a plurality of collateral spacers secured between said boards, each of said spacers being bent in zigzag formation, the overall width of said zigzag spacers being substantial relative to the size of the pallet, and the structure being symmetrical so that either of said boards may be used as an elevated platform or deck while the other of said boards acts as a base, the collateral zigzag spacers being interrupted at two points along their length to form gaps.

WALTER M. PERRY.
FAIRFIELD S. PERRY.

REFERENCES CITED

The following references are of record in the file of this patent:

UNITED STATES PATENTS

| Number | Name | Date |
|---|---|---|
| 2,388,730 | Fallert | Nov. 13, 1945 |
| 2,432,295 | Donahue | Dec. 9, 1947 |
| 2,446,914 | Fallert | Aug. 10, 1948 |
| 2,493,562 | Yarman | Jan. 3, 1950 |
| 2,506,346 | Crawford | May 2, 1950 |